United States Patent [19]
Yamamoto et al.

[11] Patent Number: 5,326,099
[45] Date of Patent: Jul. 5, 1994

[54] GOLF CLUB

[75] Inventors: Shinji Yamamoto; Kazutsugu Takamizawa, both of Hiratsuka, Japan

[73] Assignee: The Yokohama Rubber Co., Ltd., Tokyo, Japan

[21] Appl. No.: 995,691

[22] Filed: Dec. 23, 1992

[30] Foreign Application Priority Data

Dec. 26, 1991 [JP] Japan .................... 3-345599
Dec. 27, 1991 [JP] Japan ................. 3-107764[U]
Dec. 27, 1991 [JP] Japan ................. 3-107770[U]

[51] Int. Cl.$^5$ .................. A63B 53/02; A63B 53/10
[52] U.S. Cl. .................. 273/80.2; 273/80.3; 273/80 B; 273/DIG. 23
[58] Field of Search .......... 273/80 R, 80 B, DIG. 7, 273/DIG. 23, 80.2–80.8; 156/187, 188, 189, 190

[56] References Cited

U.S. PATENT DOCUMENTS

| | | | |
|---|---|---|---|
| 2,809,144 | 10/1957 | Grimes | 273/80 B |
| 2,934,345 | 4/1960 | Scott | 273/DIG. 7 X |
| 3,313,541 | 4/1967 | Benkoczy et al. | 273/80 R |
| 3,646,610 | 2/1972 | Jackson | 273/DIG. 7 X |
| 3,848,737 | 11/1974 | Kenon | 273/80.1 X |
| 3,998,458 | 12/1976 | Inoue et al. | 273/80 R |
| 4,000,896 | 1/1977 | Lauraitis | 273/DIG. 23 X |
| 4,132,579 | 1/1979 | Van Auken | 273/DIG. 7 X |
| 4,135,035 | 1/1979 | Branen et al. | 273/DIG. 23 X |
| 4,319,750 | 3/1982 | Roy | 273/80 B |
| 4,470,600 | 9/1984 | Parente et al. | 273/80.8 X |
| 4,591,155 | 5/1986 | Adachi | 273/DIG. 7 X |
| 4,757,997 | 7/1988 | Roy | 273/80 B X |
| 4,895,368 | 1/1990 | Geiger | 273/80.1 |
| 5,088,735 | 2/1992 | Shigetoh | 273/80 B |
| 5,093,162 | 3/1992 | Fenton et al. | 273/80 R X |

FOREIGN PATENT DOCUMENTS 2220576 1/1990 United Kingdom .............. 273/80.1

Primary Examiner—Vincent Millin
Assistant Examiner—Sebastiano Passaniti
Attorney, Agent, or Firm—Finnegan, Henderson, Farabow, Garrett & Dunner

[57] ABSTRACT

A golf club having a fiber-reinforced resin club shaft comprising at least a plurality of bias layers having reinforcing fibers therein disposed as to be inclined to an axial direction of the shaft and a plurality of straight layers having reinforcing fibers therein disposed in parallel with the axial direction of the shaft, the bias layers and the straight layers being wound in a tubular form, and a club head, wherein a recess formed at a tip of the club shaft is fitted to a protrusion disposed at a hosel of the club head in an over-hosel arrangement, characterized in that at least one reinforcing layer having reinforcing fibers therein arranged as cross the axial direction of the shaft is disposed only in the tip portion of the club shaft.

12 Claims, 6 Drawing Sheets

GOLF CLUB

BACKGROUND OF THE INVENTION

This invention relates to a golf club in which a club shaft made of a fiber-reinforced resin is connected to a club head in an over-hosel type, and more particularly to a golf club in which longitudinal cracking of a shaft tip portion is prevented due to impacts at the time of hitting.

Generally, the following two methods are known for connecting a fiber-reinforced resin club shaft to a club head. As shown in FIG. 17, a first method is a so-called "inner-hosel type" in which a tip portion 1a of a club shaft 1 is fitted into an insertion hole 7 in such a manner as to penetrate up to a sole 6 from above the upper end of a hosel 5 of a club head 4 as shown in FIG. 18, a second method is a so-called "over-hosel type" in which a protrusion 5a formed on the hosel 5 so as to protrude from it, is fitted into a recess 1b formed inside the tip portion 1a of the club shaft 1.

Generally, a fiber-reinforced resin club shaft consists of a laminate of a plurality of bias layers in which reinforcing fibers are inclined with respect to an axial direction of the shaft and straight layers in which the reinforcing fibers are in parallel with the axial direction of the shaft. In a golf club in which the fiber-reinforced resin club shaft is connected to the club head in the over-hosel type, expanding force from inside act on the shaft tip portion due to impacts at time of hitting, etc, so that longitudinal is likely to occur in the straight layers in the axial direction of the shaft, though such crackling does not occur in the bias layers.

To cope with the problem described above, a proposal has been made in the past which disposes a hoop layer of reinforcing fibers crossing orthogonally the axial direction of the shaft, across the entire length of the shaft. According to this proposal, however, since the hoop layer is disposed across substantially the full length of the shaft, overall rigidity of the shaft increases and there occurs the problem that the shaft lacks elasticity at the time of hitting, the distance of a hit ball decreases and feeling worsens at the time of hitting balls. Since the rigidity of the hoop layer is high, the hoop layer cannot be wound easily in a tubular form during molding of the shaft, decreasing efficiency and hence, productivity.

SUMMARY OF THE INVENTION

In a golf club of the type wherein a fiber-reinforced resin club shaft is connected to a club head in an over-hosel type, it is an object of the present invention to provide a golf club which can prevent longitudinal cracking from occurring at the tip of the shaft.

In a golf club of the type wherein a fiber-reinforced resin club shaft is connected to a club head in an over-hosel type, it is another object of the present invention to provide a golf club which improves elasticity of the shaft, the flying distance of a ball and the feel at the time of hitting of the ball.

In a golf club of the type wherein a fiber-reinforced resin club shaft is connected to a club head in an over-hosel type, it is still another object of the present invention to provide a molding method of a fiber-reinforced resin shaft which can improve efficiency at the time of molding of the shaft and can also improve productivity.

To accomplish the objects described above, the present invention is characterized in that at least one reinforcing layer having reinforcing fibers thereof so disposed as to cross the axial direction of the shaft is disposed limitedly in the tip portion of a fiber-reinforced resin club shaft comprising a laminate of bias layers and straight layers. The reinforcing layer may be a woven fabric obtained by weaving warps and wefts of the reinforcing fibers, or a hoop layer in which the reinforcing fibers are so disposed as to cross substantially orthogonally the axial direction of the shaft.

Since at least one reinforcing layer is disposed limitedly in the tip portion of the shaft as described above, the occurrence of longitudinal crack in the straight layer can be prevented even when expanding forces from inside to outside on the shaft tip portion due to the impact of hitting a ball. Since the disposition of the reinforcing layer is limited to the shaft tip portion, elasticity of the shaft at the time of hitting a ball, the flying distance of the ball and feel at the time of hitting can all be improved.

The molding method of the fiber-reinforced resin club shaft according to the present invention is characterized in that a reinforcing layer prepreg is disposed limitedly to the shaft tip portion of a straight layer prepreg and moreover, the reinforcing layer prepreg is shaped in advance as a composite layer with the straight layer prepreg, and is then wound integrally. Since the reinforcing layer prepreg is disposed only in the tip portion of the shaft at the time of molding of the shaft as described above, even a reinforcing layer prepreg having high rigidity can be wound easily. Since the reinforcing layer prepreg is shaped in advance into the composite layer integral with the straight layer prepreg and is then wound, the winding operation can be made easier, the winding time can be shortened, and productivity can be improved.

DETAILED DESCRIPTION OF THE PREFERRED EMBODIMENTS

Figure 1:
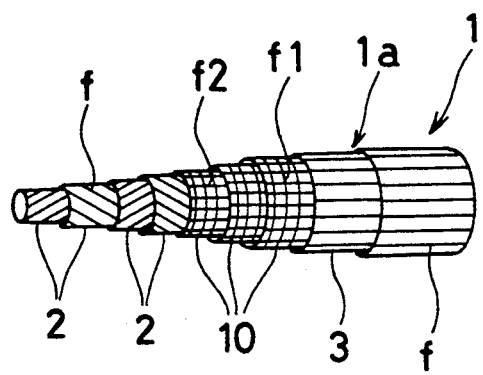
FIGS. 1 to 5 are perspective views each showing an embodiment of a fiber-reinforced resin golf club shaft used for a golf club of the present invention with its tip portion cut away.

In FIG. 1, reference numeral 1 denotes a fiber-reinforced resin club shaft for over-hosel type connection that is used for a golf club according to the present invention. This club shaft 1 is constituted by disposing and laminating four bias layers 2 as the innermost layer, three reinforcing layers 10 outside the outermost bias layer 2 and two straight layers 3 outside the outermost reinforcing layer. In the drawing, each of these layers is shown cut away sequentially from the tip side of the shaft for ease of understanding but actually, each layer covers the shaft to its end portion. The bias layers 2 are disposed in such a manner that the reinforcing fibers f thereof are inclined with respect to the axial direction of the shaft 1 and cross one another between the adjacent bias layers 2. In the straight layers 3, on the other hand, the reinforcing fibers f are disposed in parallel with the axial direction of the shaft 1. These bias and straight layers 2, 3 are disposed across the entire length of the club shaft 1. Each reinforcing layer 10 comprises a woven fabric obtained by weaving warps f1 disposed in the axial direction of the shaft and wefts f2 disposed in a direction crossing orthogonally the warps f1, and reinforcing layer 10 are disposed only at the tip portion 1a of the shaft 1.

Figure 2:
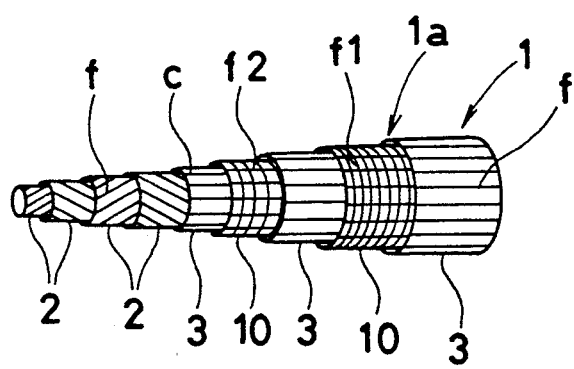

FIG. 2 shows another embodiment, in which there are three the straight layers 3 and one reinforcing layer 10 is disposed between the straight layers. The structure is otherwise the same as the embodiment shown in FIG. 1.

Figure 3:
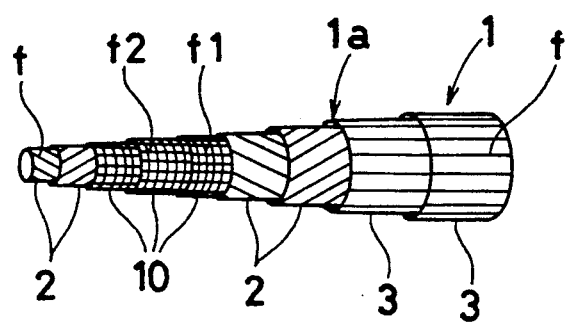

FIG. 3 shows still another embodiment, in which, among the four bias layers 2 of the embodiment shown in FIG. 1, three reinforcing layers 10 are disposed between the second and third bias layers 2.

Figure 4:
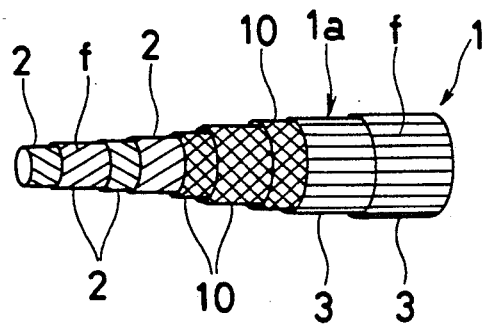

FIG. 4 shows still another embodiment, in which the warps f1 and the wefts f2 of the three reinforcing layers 10 of the embodiment shown in FIG. 1 are disposed in the direction which is biased to the axial direction of the shaft.

Figure 5:
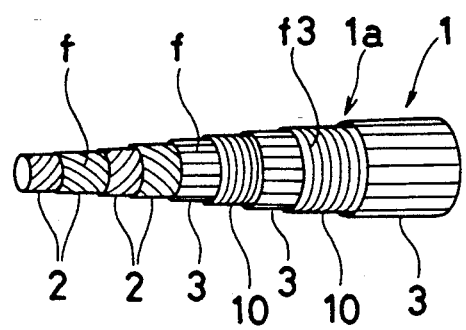

FIG. 5 shows still another embodiment, in which a hoop layer having reinforcing fibers f3 so disposed as to cross substantially orthogonally the axial direction of the shaft is used as the reinforcing layer in place of each reinforcing layer 10 consisting of the woven fabric in the embodiment shown in FIG. 2. Though not shown in the drawings, a reinforcing layer consisting of this hoop layer can be disposed between the bias layers 2 and between the bias layer 2 and the straight layer 3 in the same way as the woven fabric layer is described above.

Long fibers of carbon fibers, glass fibers, aromatic polyamide fibers, etc, can be used preferably as the reinforcing fibers constituting the reinforcing layers 10 described above, and these long fibers can also be used for the woven fabric layers and the hoop layers. The weaving structure in the case of the woven fabric layer is preferably plain weave and twill weave. Preferably, one of the warps and wefts of the woven fabric layer crosses the axial direction of the shaft at an angle of 30° to 90°. Since the reinforcing layers are disposed mainly to prevent longitudinal cracking of the straight layers, they are preferably disposed as close as possible to the straight layers such as between the outer straight layers or between the bias layers 2 and the straight layers 3.

In accordance with the invention, the reinforcing layers are limitedly disposed in the tip portion of the club that and the length in the axial direction of the shaft is preferably from 100 mm to 400 mm. If the length is less than 100 mm, longitudinal cracking in the straight layer cannot be prevented sufficiently from occurring. If the length exceeds 400 mm, on the other hand, the weight unnecessarily increases. Furthermore preferably, the reinforcing layers are disposed within 400 mm from the tip of the club shaft. Such a limited disposition provides sufficient elasticity to the club shaft 1, improves the flying distance of the hit ball and also improves feel at the time of hitting the ball. The number of layers of the reinforcing layers is at least one, preferably one to five and further preferably, three to four layers.

The molding method of the fiber-reinforced resin club shaft is not limited in particular, but the club shaft can be molded preferably by the method to be described next.

Figure 6A:
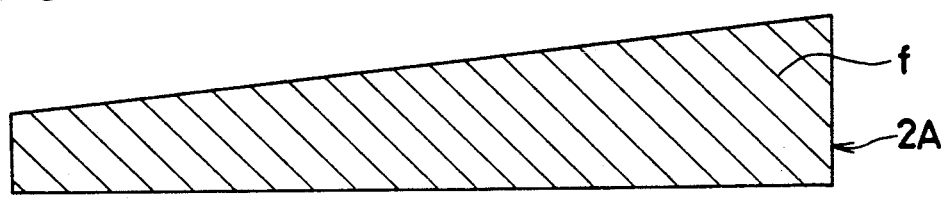
FIGS. 6a and 6b are development views of a prepreg of a bias layer used for a production method of a fiber-reinforced resin golf club shaft according to the present invention.
Figure 6B:
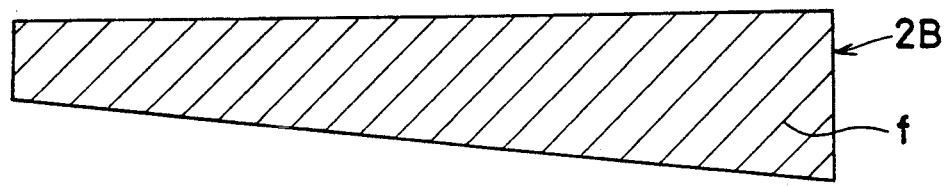
Figure 7:
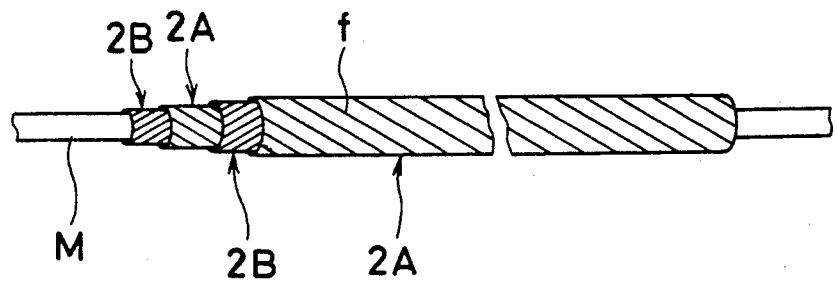
FIG. 7 is a partially cut-away perspective view showing the state where the bias layer prepreg of FIGS. 6a and 6b is wound on a mandrel.
Figure 8:
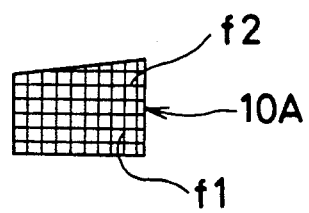
FIG. 8 is a development view of a reinforcing layer prepreg used for the production method of the fiber-reinforced resin golf club shaft of the present invention.
Figure 9:
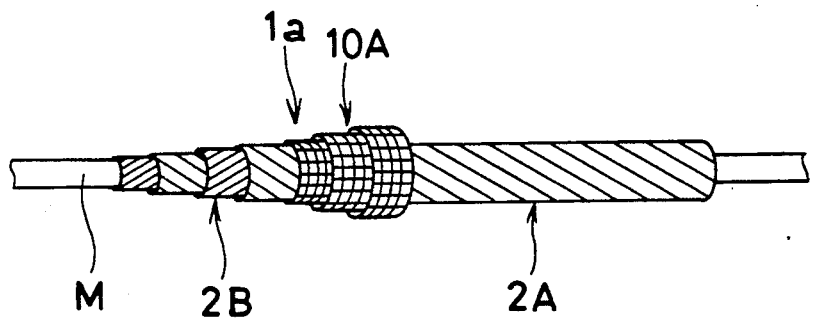
FIG. 9 is a partially cut-away perspective view showing the state where the reinforcing layer prepreg of FIG. 8 is wound to the tip of the assembly shown in FIG. 7.
Figure 10:
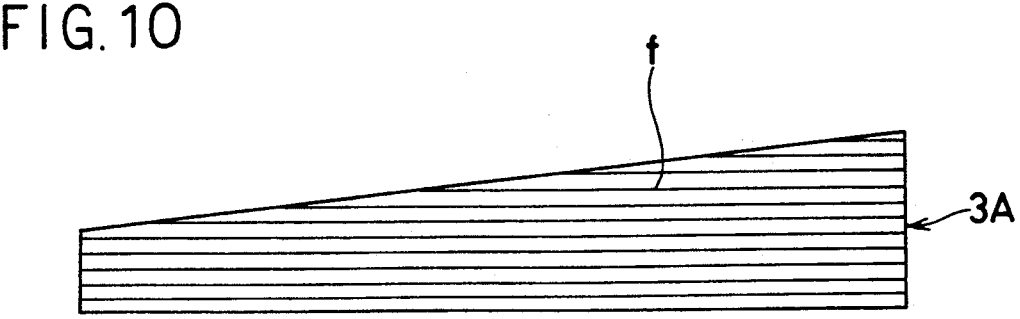
FIG. 10 is a development view of a straight layer prepreg used for the production method of the fiber-reinforced resin golf club shaft of the present invention.
Figure 11:
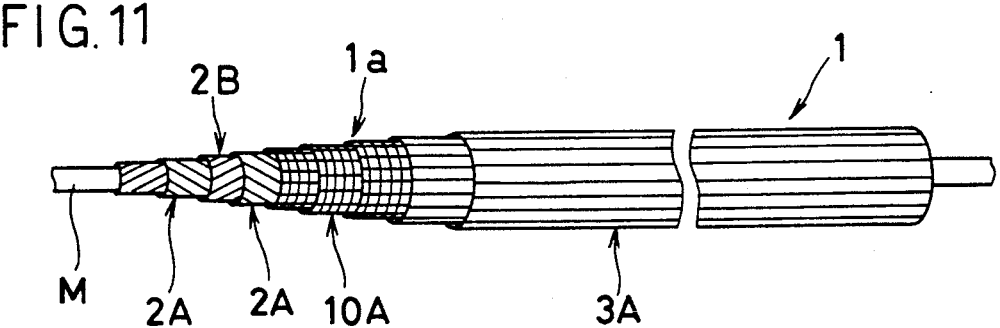
FIG. 11 is a partially cut-away perspective view showing the state where the straight layer prepreg of FIG. 10 is wound to the assembly shown in FIG. 9.

To mold the club shaft 1 shown in FIG. 1, two kinds of bias layer prepregs 2A and 2B consisting of reinforcing fibers f impregnated with an uncured resin and having mutually different directions of inclination as shown in FIGS. 6a and 6b are put one upon another in such a manner that the directions of their reinforcing fibers f cross one another and are then wound on a mandrel M as shown in FIG. 7. Next, a reinforcing layer prepreg 10A consisting of reinforcing fibers f1, f2 impregnated with an uncured resin are limitedly wound as being three layers on the shaft tip portions 1a as shown in FIG. 9. Since the reinforcing layer prepreg 10A has a small width, it can be wound easily at this time even though its rigidity is high. After the reinforcing layer prepreg 10A is thus wound, two layers of straight layer prepregs 3A consisting of reinforcing fibers f impregnated with an uncured resin shown in FIG. 10 are wound on the reinforcing layer prepreg 10A as shown in FIG. 11, and the resulting assembly is wrapped with a heat-shrinkable tape, placed into a heat-controlled oven and heat-cured.

Figure 12:
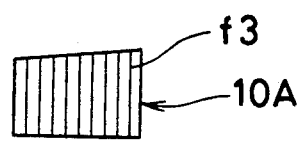
FIG. 12 is a development view of a reinforcing layer prepreg for a hoop layer used in the present invention.
Figure 13:
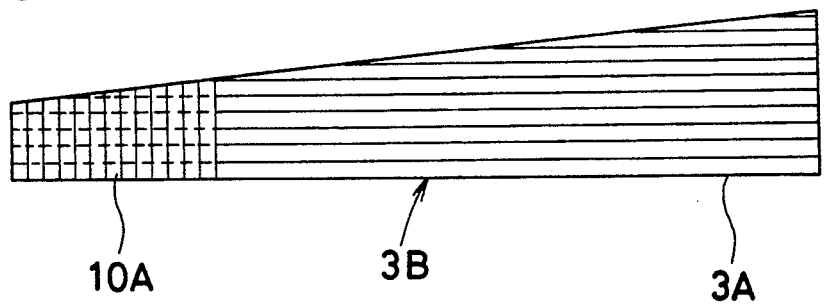
FIG. 13 is a development view of a composite layer prepreg of a straight layer prepreg and a reinforcing layer prepreg used for the production method of the fiber-reinforced resin golf club shaft used in the present invention.
Figure 14:
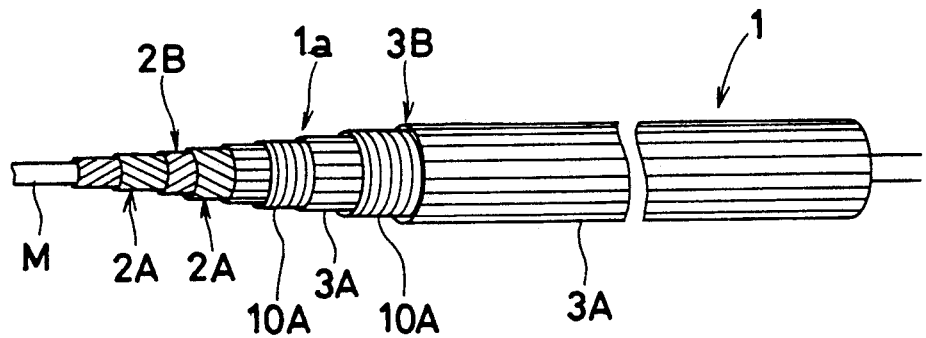
FIG. 14 is a partially cut-away perspective view showing the state where the composite layer prepreg of FIG. 13 is wound to the assembly shown in FIG. 7.
Figure 15:
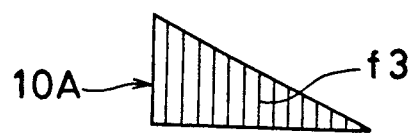
FIG. 15 is a development view showing another example of the reinforcing layer prepreg used in the present invention.

To mold the club shaft 1 shown in FIG. 5, a reinforcing layer prepreg 10A consisting of a hoop layer having reinforcing fibers f3 arranged in the longitudinal direction (direction crossing orthogonally the shaft axial direction) as shown in FIG. 12 is bonded to the tip portion of the straight layer prepreg 3A so as to form in advance a composite layer prepreg 3B as shown in FIG. 13. On the other hand, two kinds of bias layer prepregs 2A and 2B shown in FIGS. 6a and 6b are wound on the mandrel M in the same way as in FIG. 7, and then the composite layer prepreg 3B prepared in advance is wound on the bias layer prepregs 2A, 2B. The resulting assembly is then heat-cured in the same way described above.

When this club shaft 1 is molded, the reinforcing layer prepreg 10A is made composite in advance with the straight layer prepreg 3A and is wound with this straight layer prepreg. Therefore, even if the reinforcing layer prepreg 10A has high rigidity, it can be wound easily. The latter molding method can make the winding operation easier than the former.

Figure 16:
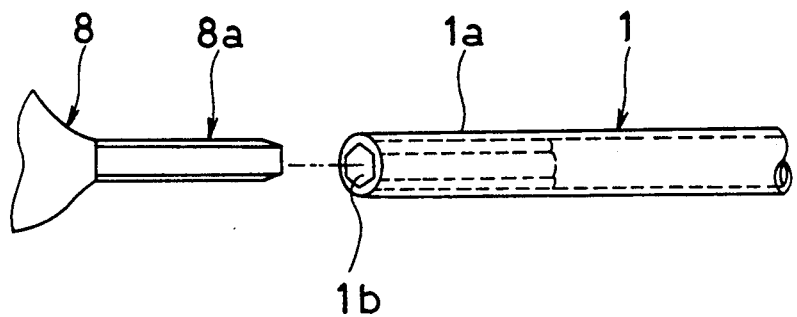
FIG. 16 is an explanatory view showing an example where the fiber-reinforced resin golf club shaft is fitted into a hosel of a club head according to the present invention.
Figure 17:
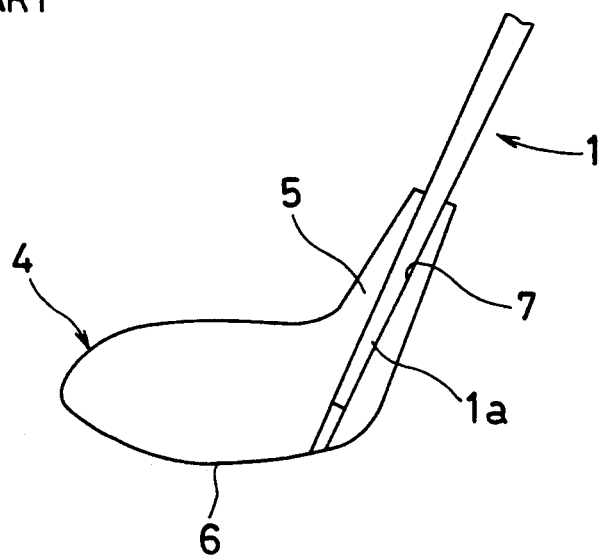
FIG. 17 is an explanatory view showing a golf club shaft of an inner-hosel type.
Figure 18:
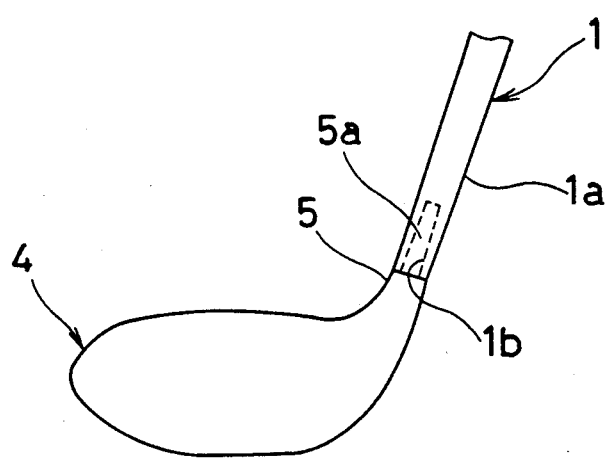
FIG. 18 is an explanatory view showing a golf club shaft of an over-hosel type.

When the club shaft described above is connected to the club head in the over-hosel type, the arrangement shown in FIG. 16 is preferably employed. In the connecting structure shown in FIG. 16, the cross-sectional shape of the hosel protrusion portion 8a of the club head 8 and that of the recess 1b at the tip 1a of the club shaft are not circular, and when they are fitted to each other, they can be coupled in such a manner as not to be capable of rotating on the axis. Accordingly, even when the club head 8 receives repeated twisting moments during the use of the golf club, the hosel protrusion portion 8a fixed into the recess 1b by an adhesive does not fall off easily from the shaft 1, and performance of the golf club can be maintained for a long period. Examples of non-circular cross-sectional include polygon, elongated circle, ellipse, star, and so forth. The depth of the recess 1b from the shaft tip is preferably up to 100 mm. The assembly work is carried out by applying the adhesive to the outer peripheral surface of the insertion portion of the club head for the hosel protrusion portion 8a, and then fitting the hosel protrusion portion 8a into the recess 1b of the shaft 1.

As described above, the golf club according to the present invention disposes limitedly at least one reinforcing layer in the shaft tip portion, and can thus prevent longitudinal cracking of the straight layers even when expanding forces act on the shaft tip portion from inside to outside by the impacts at the time of hitting of the ball. Since the disposition of the reinforcing layers is limited to the shaft tip portion, elasticity of the club shaft at the time of hitting of the ball, the flying distance of the ball and feeling at the time of hitting can all be improved. Since the reinforcing prepreg is disposed only at the tip of the shaft during molding of the club shaft, even a reinforcing layer prepreg having high rigidity can be wound easily. Since the reinforcing layer prepreg is wound as the composite layer prepreg integral with the straight layer prepreg, the winding operation can be made easier and productivity can be improved.

What is claimed is:

1. A golf club comprising a club head having a hosel portion, a protrusion extending from said hosel portion and a club shaft having an axis and a recess formed in a tip end thereof complementary with and fitted over said protrusion in an over-hosel arrangement, said club shaft comprising a plurality of fiber-reinforced resin layers wound in tubular form, said layers including a plurality of bias layers having the reinforcing fibers therein disposed in an inclined relationship with respect to the axis of the shaft, a plurality of straight layers having the reinforcing fibers therein disposed in a parallel relationship with respect to the axis of said shaft and at least one reinforcing layer having the reinforcing fibers arranged therein so as to cross the axis of the shaft, said reinforcing layer being tubularly wound in the interior of said shaft and extending from said tip end of said shaft in the axial direction only a distance of from 100 to 400 mm.

2. The golf club of claim 1, wherein said at least one reinforcing layer is woven fabric made by weaving warps and wefts of reinforcing fibers.

3. The golf club of claim 2, wherein either one of said warps and said wefts cross the axial direction of said shaft at an angle of 30° to 90°.

4. The golf club of claim 2, wherein said woven fabric is located between one of said bias layers and one of said straight layers.

5. The golf club of claim 2, wherein said woven fabric is located between to and between two of said straight layers.

6. The golf club of claim 1, wherein said at least one reinforcing layer is a hoop layer located such that the reinforcing fibers thereof cross substantially orthogonally to the axial direction of said shaft.

7. The golf club of claim 6, wherein said hoop layer is located between one of said bias layers and one of said straight layers.

8. The golf club of claim 6, wherein said hoop layer is located adjacent to and between two of said straight layers.

9. The golf club of claim 1, including a plurality of said reinforcing layers.

10. The golf club of claim 1, wherein the cross-sectional shape of said recess in the tip end of said club shaft and said protrusion of said club head are non-circular.

11. The golf club of claim 10, wherein said cross-sectional shape is a polygon, an ellipse or a star.

12. The golf club of claim 10, wherein the length of said protrusion and recess having non-circular cross-sectional shapes is not more than 100 mm in the axial direction of the shaft.

* * * * *

UNITED STATES PATENT AND TRADEMARK OFFICE
CERTIFICATE OF CORRECTION

PATENT NO. : 5,326,099
DATED : July 5, 1994
INVENTOR(S) : Shinji YAMAMOTO et al.

It is certified that error appears in the above-indentified patent and that said Letters Patent is hereby corrected as shown below:

Claim 5, column 6, line 26, change "between" (first occurrence) to --adjacent--.

Signed and Sealed this

Twenty-ninth Day of November, 1994

Attest:

BRUCE LEHMAN

Attesting Officer    Commissioner of Patents and Trademarks